United States Patent
Tisch et al.

(10) Patent No.: US 11,570,546 B2
(45) Date of Patent: Jan. 31, 2023

(54) CAMERA MICROPHONE DRAINAGE SYSTEM DESIGNED FOR BEAMFORMING

(71) Applicant: GoPro, Inc., San Mateo, CA (US)

(72) Inventors: Erich Tisch, San Francisco, CA (US); Kielan C. Crow, San Mateo, CA (US); Adrian Santos, Dublin, CA (US)

(73) Assignee: GoPro, Inc., San Mateo, CA (US)

( * ) Notice: Subject to any disclaimer, the term of this patent is extended or adjusted under 35 U.S.C. 154(b) by 407 days.

(21) Appl. No.: 16/907,683

(22) Filed: Jun. 22, 2020

(65) Prior Publication Data

US 2021/0400381 A1    Dec. 23, 2021

(51) Int. Cl.
| | |
|---|---|
| *H04R 1/44* | (2006.01) |
| *H04N 5/225* | (2006.01) |
| *H04R 1/02* | (2006.01) |
| *H04R 1/08* | (2006.01) |
| *H04R 5/027* | (2006.01) |
| *H04S 1/00* | (2006.01) |

(52) U.S. Cl.
CPC ............ *H04R 1/44* (2013.01); *H04N 5/2252* (2013.01); *H04R 1/02* (2013.01); *H04R 1/08* (2013.01); *H04R 5/027* (2013.01); *H04S 1/00* (2013.01)

(58) Field of Classification Search
CPC ... H04R 1/44; H04R 1/02; H04R 1/08; H04R 5/027; H04N 5/2252; H04S 1/00; G03B 17/08
See application file for complete search history.

(56) References Cited

U.S. PATENT DOCUMENTS

| | | | |
|---|---|---|---|
| 9,807,530 B1* | 10/2017 | Tisch | G06F 3/165 |
| 2014/0198932 A1* | 7/2014 | Parkins | H04R 1/086 |
| | | | 381/189 |
| 2017/0006398 A1* | 1/2017 | Jing | G03B 17/08 |
| 2017/0111720 A1* | 4/2017 | Miehl | H01Q 1/44 |
| 2018/0081258 A1* | 3/2018 | Clyne | H04N 5/2253 |
| 2018/0084340 A1* | 3/2018 | Clyne | H04R 1/04 |
| 2018/0123232 A1* | 5/2018 | Shope | H01Q 1/04 |
| 2020/0404126 A1* | 12/2020 | Jing | H04R 5/04 |
| 2022/0303675 A1* | 9/2022 | Clyne | H04N 5/2252 |

OTHER PUBLICATIONS

U.S. Appl. No. 16/372,611, filed Apr. 2, 2019, Inventor: Eric Penrod. 30 pages.
U.S. Appl. No. 62/901,505, filed Sep. 17, 2019, Inventor: Erich Tisch. 46 pages.
U.S. Appl. No. 62/900,936, filed Sep. 16, 2019, Inventor: Erich Tisch. 47 pages.

* cited by examiner

*Primary Examiner* — Oschta I Montoya
(74) *Attorney, Agent, or Firm* — Young Basile Hanlon & MacFarlane, P.C.

(57) ABSTRACT

An image capture device includes an audio depression formed into the housing with a drainage microphone mounted therein. A cover protects the drainage microphone disposed beneath the cover from an environment external to the image capture device. The cover and audio depression define a drainage channel extending from a channel entrance, through a channel volume, and out a channel exit. The surface area of the opening of the channel entrance is proportioned relative to the channel volume such that the ratio of the surface area to volume is greater than ten percent. This allows the cover to shift resonance outside of a desired frequency band.

20 Claims, 9 Drawing Sheets

CAMERA MICROPHONE DRAINAGE SYSTEM DESIGNED FOR BEAMFORMING

TECHNICAL FIELD

This disclosure relates generally to an audio system for a submersible image capture device. More specifically, this disclosure relates to a drainage system for a microphone that maintains acoustic transparency after liquid has drained from the system.

BACKGROUND

Photography during physical activity has been improved by use of simple-to-operate, lightweight, compact cameras. These cameras can be used in a variety of environments, including environments where the camera will be exposed to water such as beaches, lakes, pools, oceans, etc. In these environments, the camera can be splashed, submerged, or otherwise inundated with water, impacting performance of a microphone assembly within the camera that relies on air as a transmission medium to provide ambient audio, for example, in the form of audio signals and/or sound waves to the audio assembly. The presence of liquids such as water can distort or block the ambient audio from reaching the microphone assembly within the camera. Techniques for addressing the presence of liquid near the microphone assembly can interfere with the audio assembly's ability to capture resonance-free ambient audio when liquid is not present.

SUMMARY

Disclosed herein are implementations of a microphone drainage system for an image capture device.

In one embodiment, an image capture device includes a housing defining an audio depression, a drainage microphone coupled to the housing at a location of the audio depression, a cover coupled to the housing and configured to protect the drainage microphone from an environment external to the image capture device, and a drainage channel defined between the cover and the housing defining a channel entrance, a channel volume and a channel exit. The channel entrance is sized such that ratio of the surface area of its opening to the channel volume is greater than ten percent to move audio sound wave resonance outside of a desired frequency range.

In one embodiment, an image capture device includes a housing defining an audio depression, an drainage microphone assembly coupled to the housing at a location of the audio depression, a cover coupled to the housing and configured to protect the drainage microphone from an environment external to the image capture device, and a drainage channel defined between the cover and the housing defining a channel entrance having a channel entrance width and a channel entrance height, a channel volume having a channel volume width a channel volume height and a channel volume depth, and a channel exit having a channel exit width and a channel exit height. The channel entrance width is at least five times the channel entrance height to maximize surface area while maintaining appearance and minimizing debris incursion. The ratio of the surface area of the opening of the channel entrance to the channel volume is configured to render the cover acoustically transparent by moving audio sound wave resonance outside of the 500 Hz to 9 kHz frequency range.

In one embodiment, an image capture device includes a housing defining an audio depression, an drainage microphone assembly coupled to the housing at a location of the audio depression, a cover coupled to the housing and configured to protect the drainage microphone from an environment external to the image capture device, and a drainage channel defined between the cover and the housing defining a channel entrance having a channel entrance width and a channel entrance height, a channel volume having a channel volume width a channel volume height and a channel volume depth, and a channel exit having a channel exit width and a channel exit height. The channel entrance width is at least five times the channel entrance height to maximize surface area while maintaining appearance and minimizing debris incursion. In addition, the ratio of the surface area of the openings of the channel entrance and channel exit to the channel volume are both greater than ten percent to move audio sound wave resonance frequencies outside of the 500 Hz to 9 kHz frequency range.

Additional embodiments are described in further detail below.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Performance of a microphone assembly disposed within a housing of an image capture device can be improved using an efficiently-designed drainage system that both allows ambient audio (e.g. audio signals and/or sound waves) to reach the drainage microphone and moves moisture away from the drainage microphone. For example, an image capture device using a drainage system can include a housing defining an audio aperture and a drainage microphone coupled to the housing at a location of the audio aperture. The drainage system can include a cover coupled to the housing, with the cover configured to protect the drainage microphone from an environment external to the image capture device. The cover can define a drainage channel that allows both air and liquid to flow between the cover and to reach the drainage microphone. The drainage system can include a drainage channel defined between the cover and the housing that is configured to allow air to reach the drainage microphone and to drain moisture from the drainage microphone when the image capture device emerges from a liquid such as water. The drainage channel can include a channel entrance, a channel volume, and channel exit. The channel entrance and channel exit can be proportioned, relative to the channel volume, to prevent audio sound wave resonance within an audio frequency band such that the cover becomes effectively acoustically transparent for a desired range of frequencies.

Figure 1A:
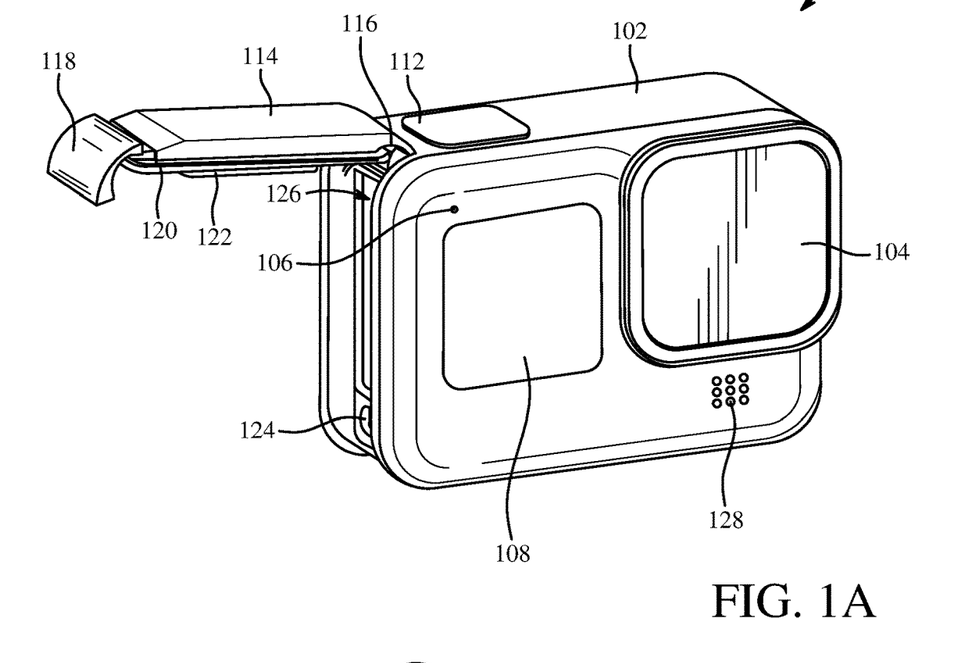
FIGS. 1A-B are isometric views of an example of an image capture device.
Figure 1B:
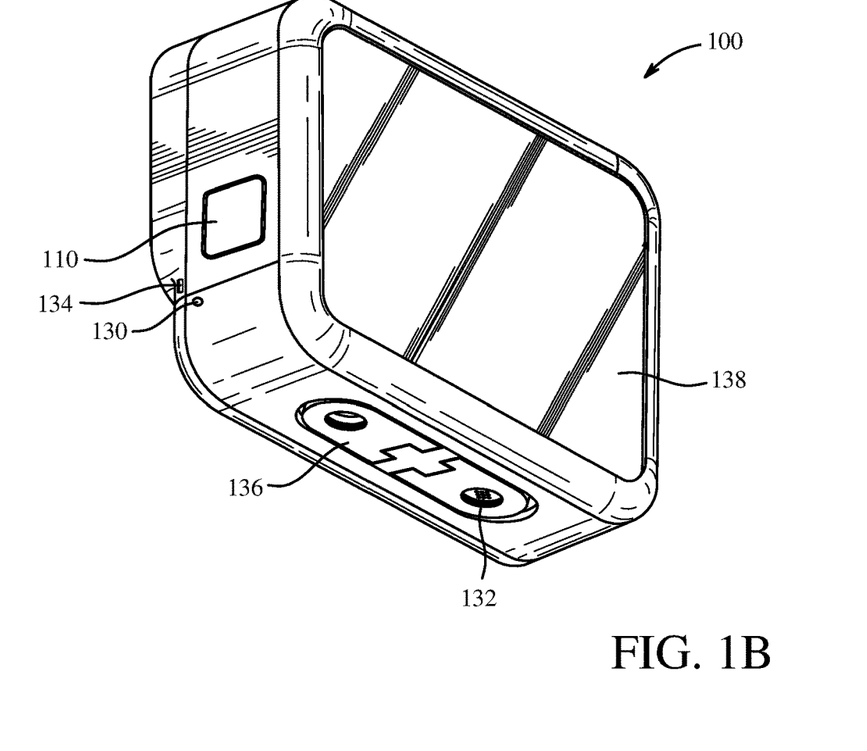

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 3:
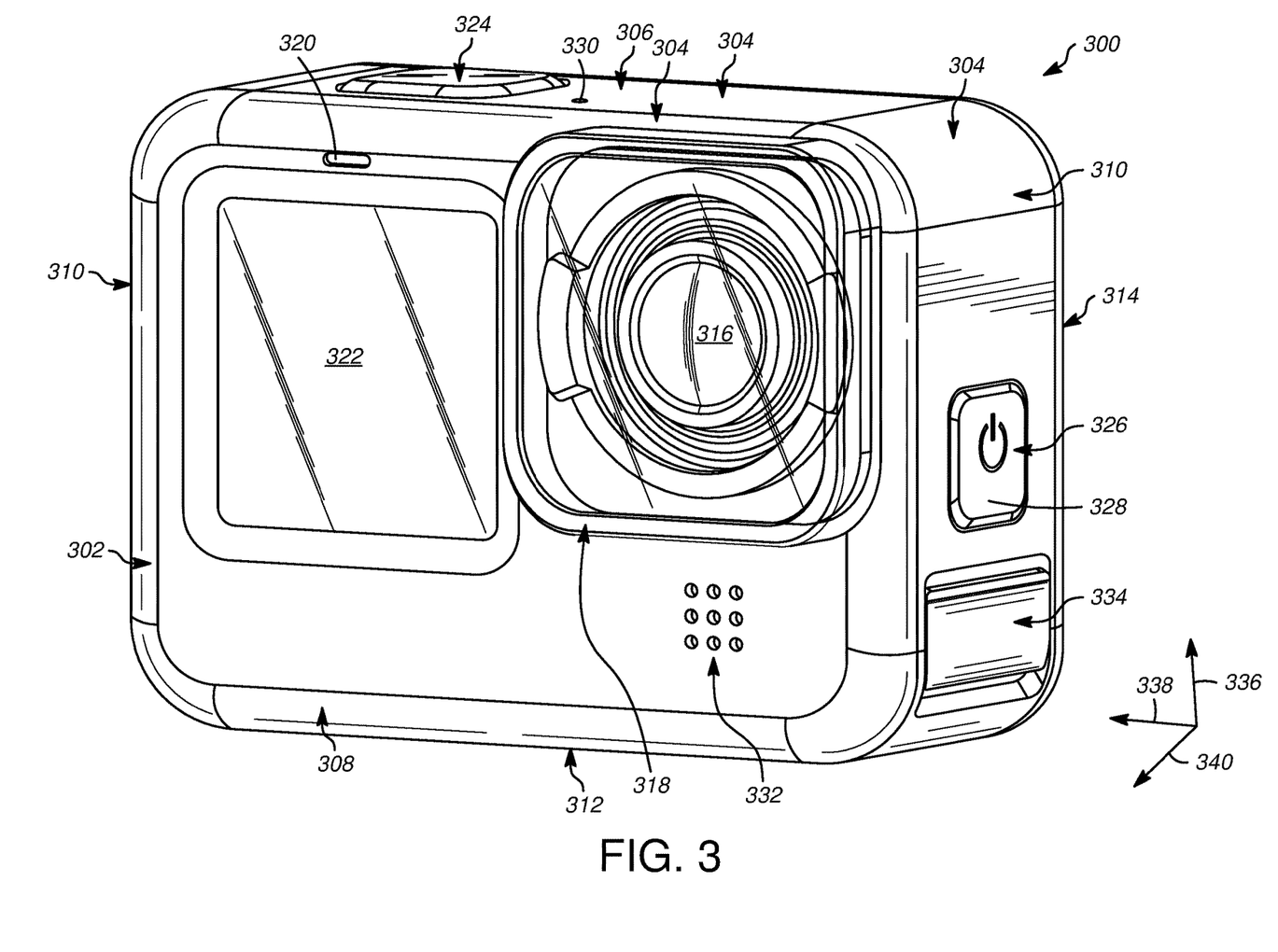
FIG. 3 is an isometric view of an alternate example of an image capture device.
Figure 4A:
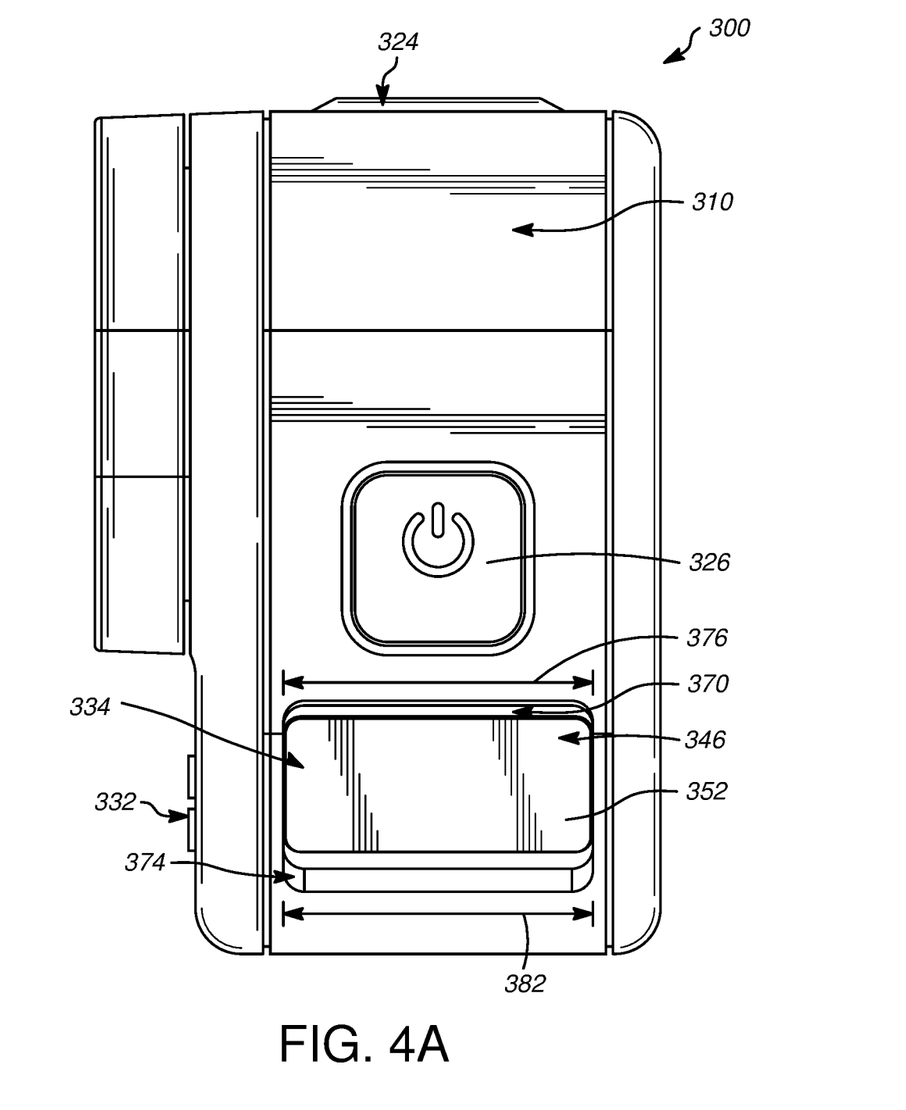
FIG. 4A is a side view of the image capture device shown in FIG. 3.
Figure 4B:
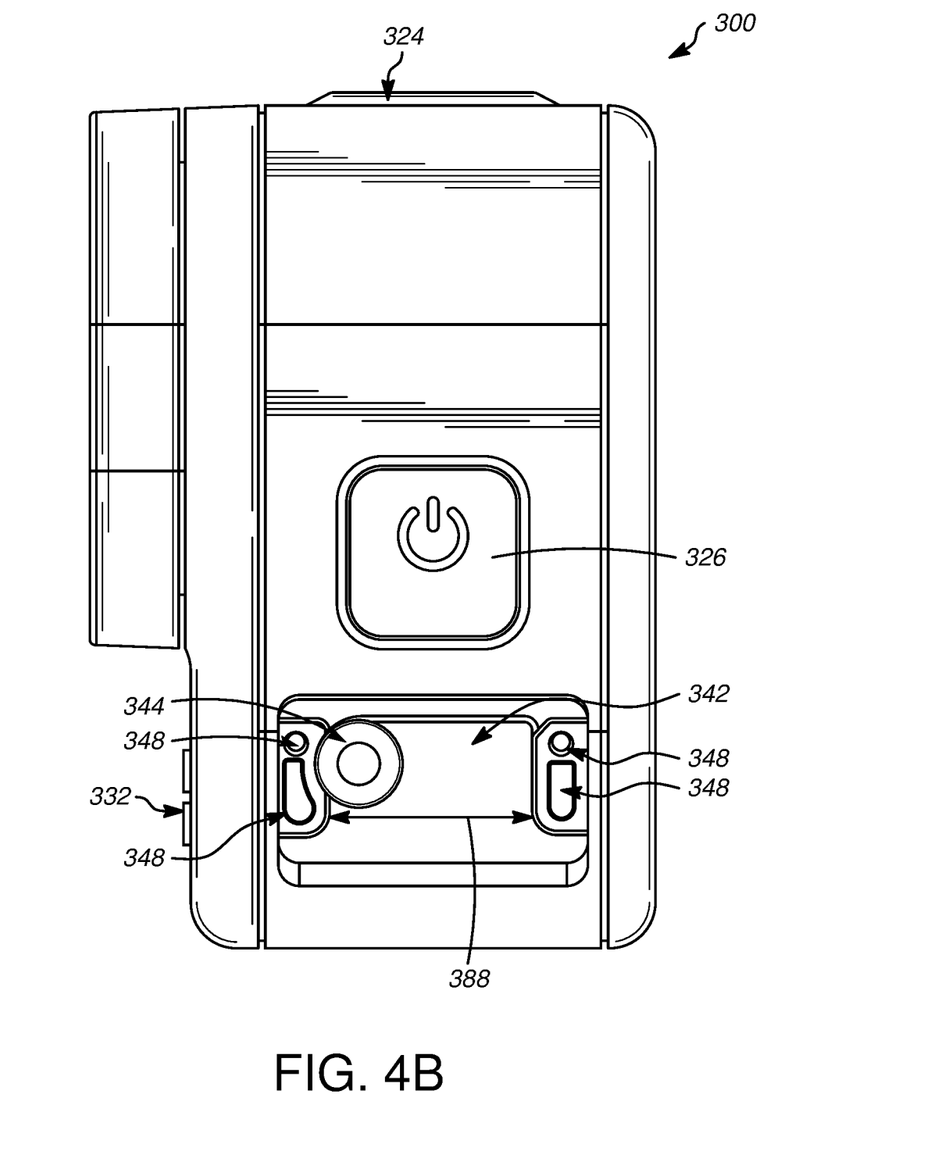
FIG. 4B is a side view of the image capture device shown in FIG. 3, the view showing the drainage microphone assembly without the cover.
Figure 5:
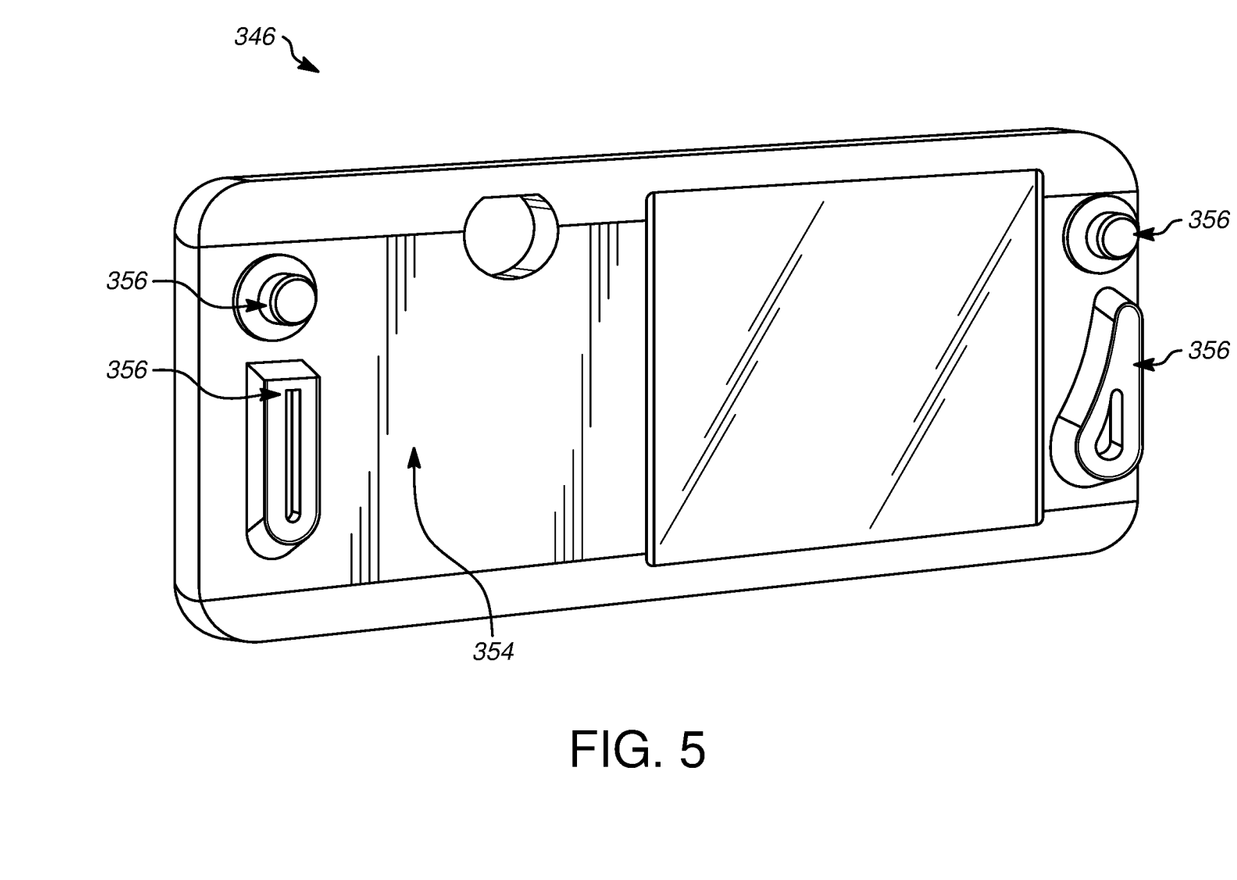
FIG. 5 is a detailed rear view of the cover of the image capture device shown in FIGS. 3 and 4A.

The image capture device 100 may be used to implement some or all of the techniques described in this disclosure, such as the technique for implementing a drainage microphone into advanced audio processing applications as described in FIGS. 3-5.

Figure 2:
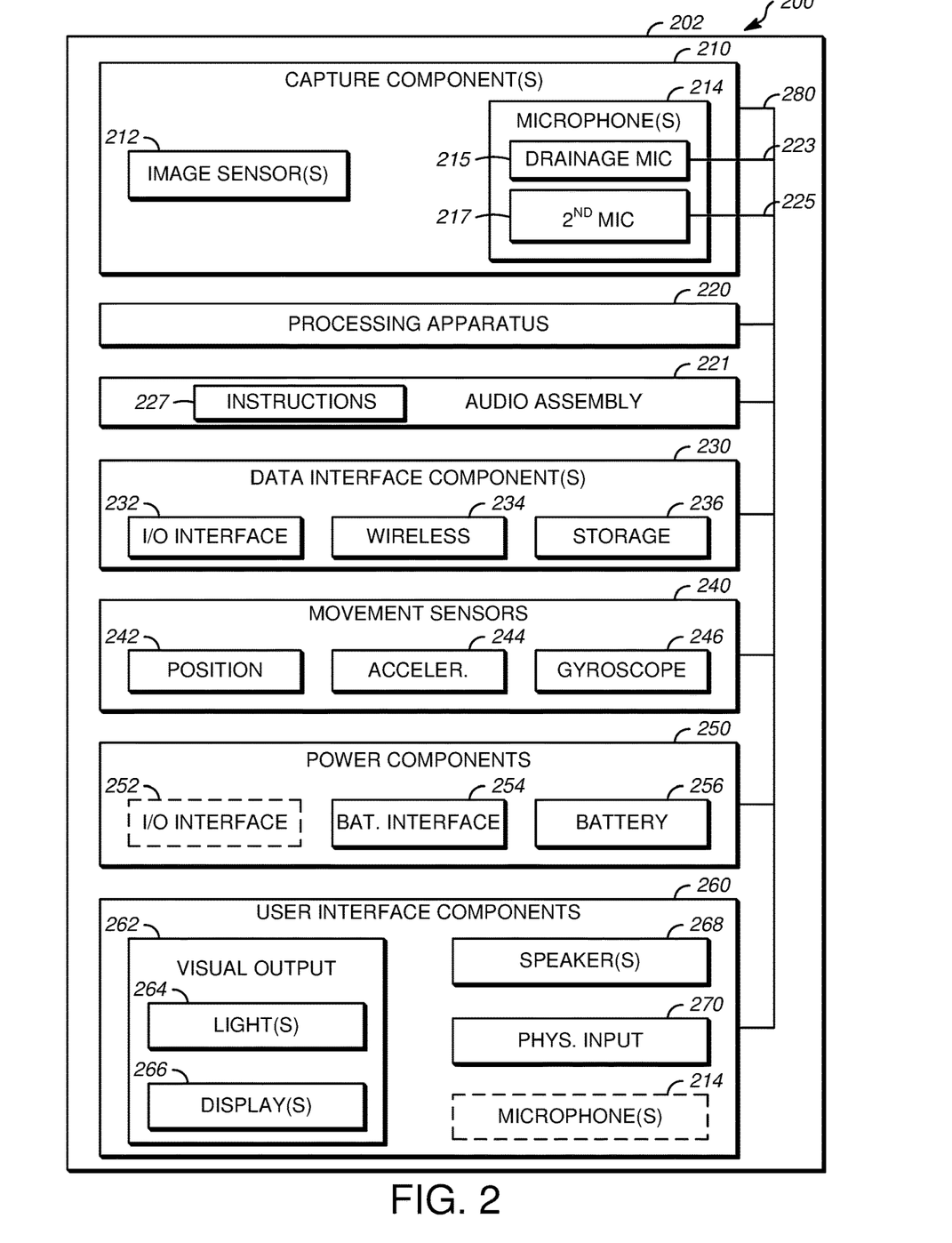
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture devices 100, 300 of FIGS. 1A-B and 3-7.

The image capture device 200 includes a body 202 which includes electronic components such as capture components 210, a processing apparatus 220, an audio assembly 221, data interface components 230, movement sensors 240, power components 250, and/or user interface components 260.

The capture components 210 include one or more image sensors 212 for capturing images and one or more microphones 214 for capturing audio. In one example, the capture components 210, specifically, the microphones 214, include a drainage microphone 215 and a second microphone 217. The processing apparatus 220 is coupled with memory storing instructions 227 from which executable instructions may be obtained. The processing apparatus 220 is in communication with the audio assembly 221. The audio assembly 221 may be coupled to and/or include the drainage microphone 215 and a second microphone 217 (such as a front microphone). The audio assembly 221 is configured to capture a first audio channel 223 from the drainage microphone 215 and a second audio channel 225 from the second microphone 217 based on sound from an audio source. The audio assembly 221 outputs these audio channels 223/225 to the processor.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include the I/O interface 232, as indicated in dotted line, and the power components 250 may receive power from an external source, such as a wall plug or external battery, for operating the image capture device 200 and/or charging the battery 254 of the image capture device 200.

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

The image capture device 200 may be used to implement some or all of the techniques described in this disclosure, such as the technique for implementing a drainage microphone into advanced audio processing applications as described in FIGS. 3-5.

FIG. 3 illustrates another example of an image capture device 300 similar to the image capture device 100 described in detail in FIGS. 1A and 1B. The image capture device 300 includes a housing 302 defining a plurality of generally orthogonal surfaces 304. These orthogonal surfaces 304 may include a top surface 306, a front surface 308, two side surfaces 310, a bottom surface 312, and a rear surface 314. The image capture device 300 may further include at least one camera lens 316 disposed on a surface of the housing 302 and a transparent protective lens cover 318 mounted on the housing 302 to protect the camera lens 316 from environmental damage.

The image capture device 300 may include electronics (e.g., imaging electronics, power electronics, etc.) internal to the housing 302 for capturing images via the lens 316 and/or performing other functions. The image capture device may include various indicators such as an LED light 320 and may include an interactive display 322 that allows for interaction with the image capture device 100 while simultaneously displaying information on a surface of the image capture device 100. The image capture device 100 may include various input mechanisms such as buttons, switches, and touchscreen mechanisms. For example, the image capture device 300 may include buttons 324 configured to allow a user of the image capture device 300 to interact with the image capture device 300, to turn the image capture device 300 on, and to otherwise configure the operating mode of the image capture device 300. In an implementation, the image capture device 300 includes a power button and a mode button. It should be appreciated, however, that, in alternate embodiments, the image capture device 300 may include additional buttons to support and/or control additional functionality. The image capture device 300 may also include I/O ports 326 positioned behind a movable waterproof port cover 328. In another example, the image capture device 300 may include additional buttons or different interface features, such as interchangeable lenses, cold shoes, and hot shoes that can add functional features to the image capture device 300, etc. In some embodiments, the image capture device 300 described herein includes features other than those described.

The image capture device 300 may also include one or more microphones configured to receive and record audio signals (e.g., voice or other audio commands) in conjunction with recording video or in connection with audible control commands. In the example shown in FIG. 3, three microphones are shown using representative patterns of apertures or depressions extending partially into or fully through the housing 302, though any number of microphones, such as one, two, four, or six may be used. The apertures or depressions may be a combination of design features formed as depressions in the body or housing 302 and apertures that extend fully through the body or housing 302. The patterns of apertures and depressions are designed to allow the microphones disposed within the housing 302 proximate to locations of the apertures and depressions (i.e., nearby) to capture ambient audio from an environment external to the housing 302 of the image capture device 300. In an implementation, the microphones may include a top microphone 330 positioned below the top surface 306, a front microphone 332 positioned below the front surface 308, and a drainage arrangement 334 positioned on one of the side surfaces 310. Although the drainage arrangement 334 is depicted on a side surface 310, it is contemplated that it could be located on any suitable surface of the housing 302 that allows for gravity to support liquid trapped within it to drain when the image capture device 300 is moved from a liquid environment to a non-liquid environment. For reference purposes, the image capture device 300 may be referenced by a vertical axis 336 aligned in the direction between the top surface 306 and the bottom surface 312, a horizontal axis 338 aligned in the direction between the two side surfaces 310, and a fore/aft axis 340 aligned in the direction between the front surface 308 and back surface 314.

FIGS. 4A and 4B are side views of the image capture device 300 depicted in FIG. 3. The drainage arrangement 334 includes an audio depression 342 formed in the housing 302. The audio depression 342 is an indent in the side surface 310 of the housing 302. A drainage microphone 344 is coupled to the housing 302 within the audio depression 342 as shown in FIG. 4B. The drainage microphone 344 is described in greater detail below. The drainage arrangement 334 includes a cover 346 coupled to the housing 302 at the location of the audio depression 342 as shown in FIG. 4A. The cover 346 may be formed of any suitable material and may be mounted to, molded onto, or formed on the housing 302 in any suitable manner. In one arrangement, the cover 346 is attached to the audio depression 342 and housing 302 by way of mounting indentations 348 formed in the housing 302 at the location of the audio depression 342. In at least one arrangement, the mounting indentations 348 may include elongated indentations and circular indentations. The utilization of varied shaped mounting indentations 348 is useful during assembly to insure proper orientation of the cover 346 as well as provide a secure attachment location.

The cover 346 defines an outer cover surface 352 and an inner cover surface 354 (see FIG. 5). The inner cover surface 354 may include mounting protrusions 356 configured to compliment the mounting indentations 348 formed in the housing 302. These mounting protrusions 356 may be positioned within the mounting indentations 348 and affixed by way of a variety of methods, including but not limited to the use of adhesive.

Figure 6A:
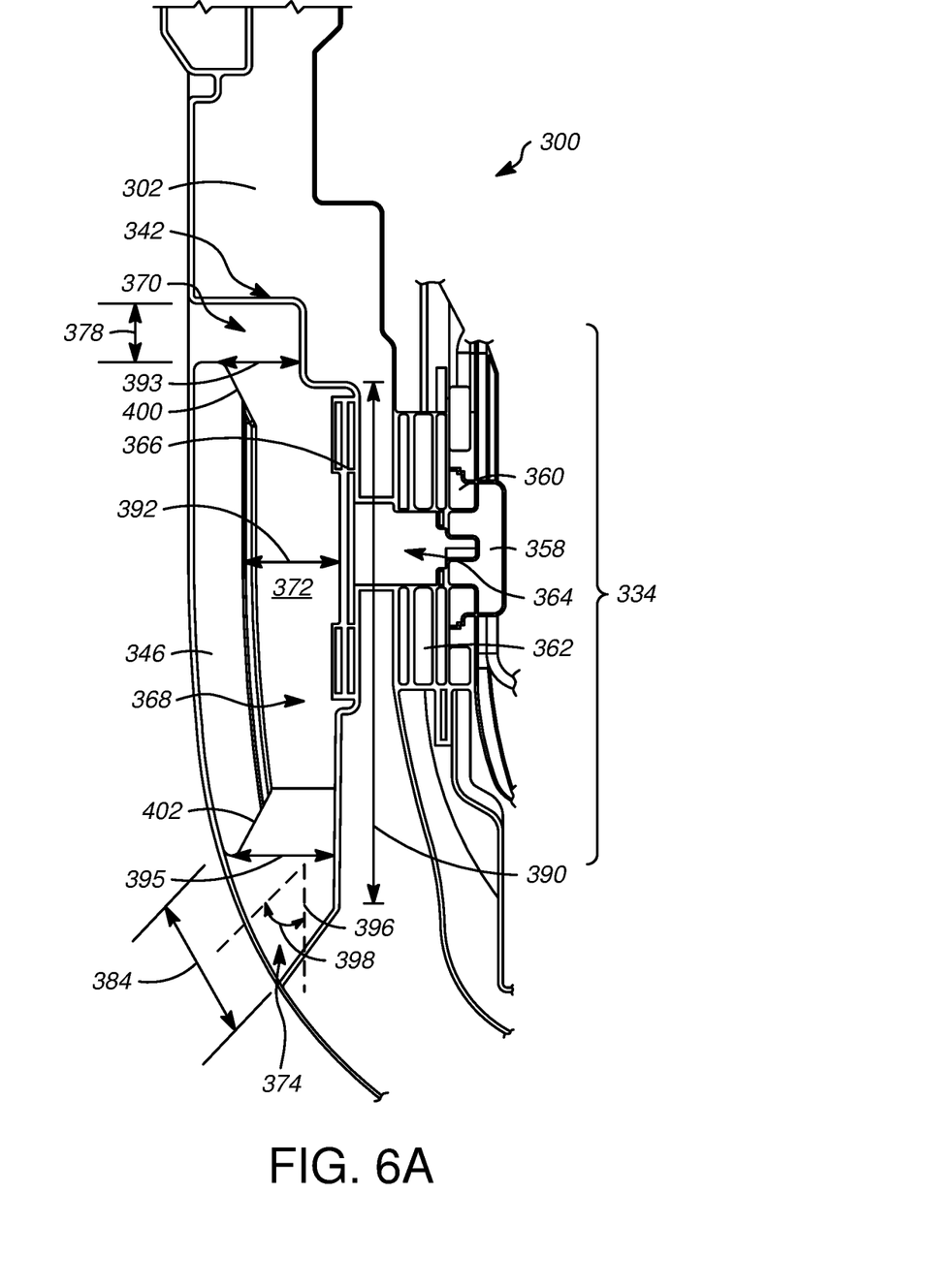
FIG. 6A is a cross-sectional view of the drainage microphone assembly shown in FIGS. 3 and 4A.
Figure 6B:
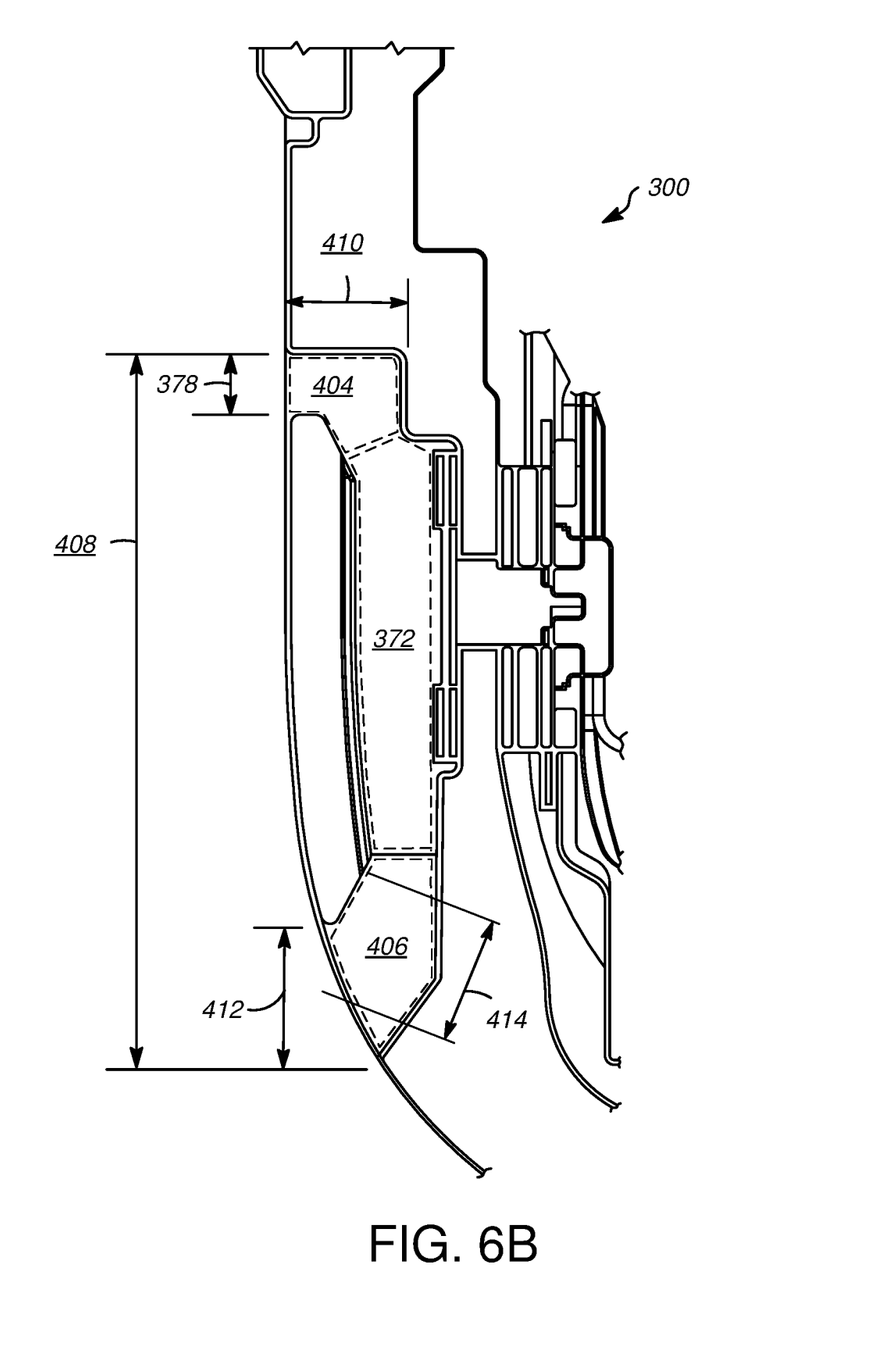
FIG. 6B is the cross-sectional view of the drainage microphone assembly shown in FIG. 6A with additional references.

FIGS. 6A and 6B are cross-sectional images of the image capture device 300 shown in FIG. 3 detailing the drainage microphone 344. In this example, the drainage microphone 344 includes at least one drainage microphone element 358 positioned internally to the housing 302. A compression gasket 360 and an acoustic sealing gasket 362 are positioned between the drainage microphone element 358 and the housing 302. An audio aperture 364 is formed in the housing to allow audio to pass through from the exterior of the housing 302 to the drainage microphone element 358. A waterproof membrane 366 is mounted onto an innermost surface of the audio depression 342 exterior to the port 364 to prevent liquid from directly contacting the microphone element 358.

The cover 346, when mounted to the audio depression 342, defines a drainage channel 368 through which liquids can flow. The drainage channel 368 can fill with liquid when the image capture device 300 is submerged during operation. When the image capture device 300 is removed from the liquid environment, the drainage channel 368 utilizes gravity to drain moisture from the drainage microphone 344 and allow the moisture to exit from the housing 302. The drainage channel 368 includes a channel entrance 370, an entrance volume 404, a channel volume 372, a channel exit 374, and an exit volume 406. The drainage channel 368 may be further defined by an overall passage height 408 and an overall passage width 410. The channel entrance 370 is defined by a channel entrance width 376 (see FIG. 4A) and a channel entrance height 378. The surface area of the channel entrance 370 may be defined by the channel entrance width 376 multiplied by the channel entrance height 378 in the example illustrated in the described example. In other examples, however, the surface area of the opening of the channel entrance 370 may be defined simply as the planar surface area of the channel entrance 370. It is contemplated that the channel entrance 370 may, in other examples, have more complex geometric shapes as opposed to the generally rectangular opening illustrated in FIGS. 3-6.

The drainage channel 368 may further include a channel exit 374. The channel exit may be defined by a channel exit width 382 (see FIG. 4A) a channel exit height 384, and a channel exit depth 414. The surface area of the channel exit 374 may be defined by the channel exit width 382 multiplied by the channel exit height 384. The channel exit 374 may also be defined by a channel exit vertical height 412 representing the height along the vertical axis 336. In other examples, however, the surface area of the channel exit 374 may be defined simply as the planar surface area of the channel exit 374. It is contemplated that the channel exit 374 may be formed with more complex geometric shapes as opposed to the generally rectangular opening illustrated in FIGS. 3-6.

The drainage channel 368 forms a channel volume 372. The channel volume 372 may be generally defined by a channel volume width 388 (see FIG. 4B), a channel volume height 390, and a channel volume depth 392. A rough estimate of the channel volume 372 size may be obtained by multiplying the channel volume width 388 by the channel volume height 390 by the channel volume depth 392. It should be understood that a precise measuring of the channel volume 372 may be obtained through a variety of known measurements and/or calculations. It is contemplated that in some examples, the channel volume depth 392 need not be uniform but may vary from an upper channel volume depth 393 to a lower channel volume depth 395. In such cases, the channel volume 372 may be defined by the average volume depth or may be accurately calculated based on the varying depth throughout the channel volume height 390.

One challenge with known drainage microphone configurations is the production of resonance through drainage channels towards the internal microphone. In one exemplary example, the present disclosure contemplates the selection of a desired frequency range of audio signals for which resonance through a drainage channel can be moved, reduced, and/or eliminated. When the resonance for a desired frequency range of audio signals is moved, reduced, and/or eliminated in a drainage design, the design and structure of forming the drainage channel can be considered acoustically transparent. Moving or shifting resonance to achieve acoustic transparency in a predetermined frequency range can include reducing or eliminating resonance. The present disclosure determined that the frequency range of resonance is directly related to the ratio of the surface area of the entrance or exit of the drainage channel to the volume of the drainage channel. In one example, the desired range of audio frequencies for which acoustic transparency is desired is 500 Hz to 9 kHz. This allows the audio captured by the drainage microphone 344 to be utilized in advanced audio processing functions such as beamforming, as will be subsequently discussed.

In one example, the ratio of the surface area of the channel entrance 370 to the channel volume 372 is greater than 10% to move resonance outside of the 500 Hz to 9 kHz frequency range. In another example, the ratio of the surface area of the channel entrance 370 to the channel volume 372 is approximately 16%. In one example, the channel entrance width 376 is approximately 18 mm and the channel entrance height 378 is approximately 1 mm. The channel entrance width 376 may be elongated compared to the channel entrance height 378 to allow the surface area of the channel entrance 370 to be maximized while simultaneously providing a minimal profile for visual appearances as well as minimizing the intrusion of solid foreign bodies into the drainage channel 368. In one example, the channel entrance width 376 is at least five times as large as the channel entrance height 378. In another example, the channel entrance width 376 is approximately eighteen times as large as the channel entrance height 378. In one detailed example, the channel entrance width 376 is approximately 18.3 mm, the channel entrance height 378 is approximately 0.97 mm, and the channel volume 372 is approximately 112.56 mm$^3$. In another detailed example, the entrance volume 404 is approximately 52.52 mm$^3$ and the exit volume 406 is approximately 63.79 mm$^3$.

Similarly, in one example, the ratio of the surface area of the channel exit 374 to the channel volume 372 is greater than 10% to move resonance outside of the desired frequency range. In another example, the ratio of the surface area of the channel exit 374 to the channel volume 372 is greater than 20%. In still another example, the ratio of the surface area of the channel exit 374 to the channel volume 372 is approximately 25%. The surface area of the channel exit 374 may be greater than the surface area of the channel entrance 370 to allow for solid foreign bodies that may pass through the channel entrance 370 to easily be flushed from the channel volume 372. The channel exit width 382 may be elongated as compared to the channel exit height 384 to allow for a minimized visual profile and to prevent the intrusion of solid foreign bodies into the channel volume 372. In one example, the channel exit width 382 is at least five times as large as the channel exit height 384. In still another example, the channel exit width 382 is approximately eight times as large as the channel exit height 384. In one another example, the channel exit width 382 is approximately 18.3 mm and the channel exit height 384 is approximately 1.87 mm, the channel exit vertical height 412 is approximately 2.12 mm, and the channel exit depth 414 is approximately 1.81 mm. In still another example, the channel volume width 388 is approximately 12.2 mm, the channel volume height 390 is approximately 8.6 mm and the channel volume depth 392 varies between 1.2 mm and 1.6 mm. In one example, the channel volume depth 392 varies between 1.22 mm at the upper channel volume depth 393 to 1.51 mm at a central location and back to 1.2 mm at the lower channel volume depth 395. In one example, the overall passage height 408 is approximately 11.15 mm and the overall passage width 410 is approximately 2.37 mm.

In one example, the channel entrance 370 and the channel exit 374 are located on the same orthogonal surface 304 of the housing 302. The channel entrance 370 may be formed perpendicular to the vertical centerline 396 of the channel volume 372. The channel exit 374 may be formed at an angle 398 relative to the vertical centerline 396 of the channel volume 372 to facilitate drainage and to further shift resonance outside of the desired frequency range. In one example, the angle 398 of the channel exit 374 is between 20 degrees and 60 degrees from the vertical centerline 396. In another example, the angle 398 of the channel exit 374 is approximately 52 degrees from the vertical centerline 396. In one example, the channel exit vertical height 412 is approximately 2.12 mm to prevent water retention and audio blocking within the entrance volume 404 and the exit volume 406. In another example, the channel exit vertical height 412 is greater than 1.62 mm to prevent water retention and audio blocking within the entrance volume 404 and the exit volume 406. The inner cover surface 354 of the cover 346 may include an upper cover chamfer/bevel 400 formed to be positioned between the channel entrance 370 and the channel volume 372 to facilitate flow of liquid and audio frequency transfer through the drainage channel 368. The inner cover surface 354 of the cover 346 may include a lower cover chamfer or bevel 402 positioned between the channel exit 374 and the channel volume 372 to facilitate flow of liquid out of the drainage channel 368 as well as audio frequency transition through the drainage channel 368. In at least one example, the lower cover chamfer or bevel 402 is formed to match the angle 398 of the channel exit 374 relative to the vertical centerline 396. Furthermore, it is contemplated that the cover 346 may include a contoured outer cover surface 352 and a partially concave inner cover surface 354 (see FIGS. 4A and 5) for both esthetics as well as audio transmission and reflection benefits.

In one example, in order to push resonance over 9 kHz, the channel entrance width 376 and the channel exit width 382 are greater than 4 mm while all other dimensions remain constant. In another example, in order to push resonance over 9 kHz, the channel volume 372 is less than 400 mm$^3$ while all other dimensions remain constant. Although two specific examples have been provided, it is contemplated that other combinations of channel entrance/exit widths 376/382 and channel volumes 372 may be utilized in conjunction to push resonance over 9 kHz.

The drainage microphone element 358 may be positioned on the side surface 310 within the audio depression 342 such that it is biased towards the front surface 308 of the body or housing 302. In this example, the drainage microphone element 358 is positioned closer to the front surface 308 relative to the vertical centerline 396. This allows the drainage microphone element 358 to be positioned relative to the front microphone 332 such that they are positioned less than 30 degrees from each other relative to the horizontal axis 338. The close proximity, small horizontal deviation, and the acoustic transparency of the drainage microphone assembly 344 allow the described drainage microphone arrangement 334 to be utilized in sophisticated audio processing procedures such as beamforming.

Figure 7:
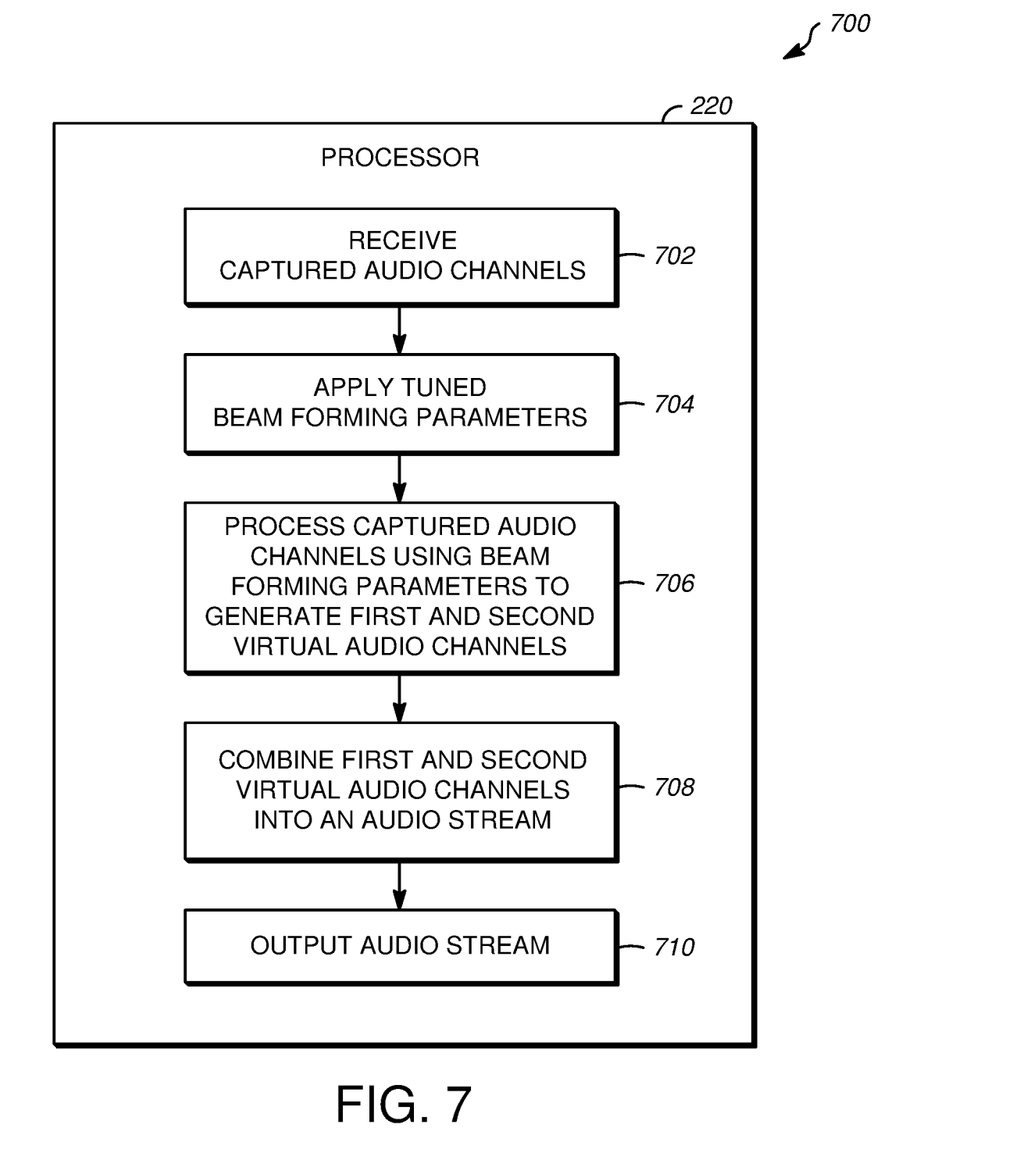
FIG. 7 is a flow chart illustrating the processing steps of the processor illustrated in FIG. 2.

FIG. 7 is a flowchart of an exemplary set of executable instructions 700 for use by the processing apparatus 220 of FIG. 2. The steps or instructions 700 include receiving the captured audio channels from the audio assembly 702. The instructions 700 may then apply a set of tuned beamforming parameters to the captured audio channels 704. While a variety of beamforming parameters and techniques are contemplated by the present disclosure, one embodiment utilizes the audio signals from two microphones positioned on different surfaces to generate a stereo audio signal. The unique acoustic transparency features of the drainage arrangement 334 described in FIGS. 3-6 allow these processes to be applied utilizing a drainage microphone 344 to obtain a reference audio channel. The steps further include processing the captured audio channels using the set of tuned beamforming parameters to generate a first virtual audio channel and a second virtual audio channel 706. The processing apparatus 220 then combines the first virtual audio channel and the second virtual audio channel into an audio stream that is configured for stereo audio playback 708. Finally, the processing apparatus 220 outputs the audio stream 710. Although an example of beamforming audio processing has been described, it should be understood that a broad range of audio processing is contemplated by the present disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
    a housing defining an audio depression;
    a drainage microphone coupled to the housing at a location of the audio depression;
    a cover coupled to the housing to protect the drainage microphone from an environment external to the image capture device; and
    a drainage channel defined between the cover and the housing to drain moisture from the drainage microphone, the drainage channel defining a channel entrance, a channel volume, and a channel exit, wherein a ratio of a surface area of an opening of the channel entrance to the channel volume is greater than ten percent.

2. The image capture device of claim 1, wherein the channel volume is greater than 400 mm$^3$.

3. The image capture device of claim 1, wherein the ratio of the surface area of the opening of the channel entrance to the channel volume moves resonance outside of a 500 Hz to 9 kHz frequency range.

4. The image capture device of claim 1, wherein the cover includes an outer cover surface, an inner cover surface, and an upper cover chamfer formed on the inner cover surface adjacent the channel entrance.

5. The image capture device of claim 1, wherein the cover includes an outer cover surface, an inner cover surface, and a lower cover chamfer formed on the inner cover surface adjacent the channel exit.

6. The image capture device of claim 5, wherein the channel exit is angled between 20 degrees and 60 degrees relative to a vertical axis of the housing.

7. The image capture device of claim 6, wherein the channel exit is angled 52 degrees relative to the vertical axis of the housing.

8. The image capture device of claim 1, further comprising:
    a front microphone;
    wherein the audio depression is formed on a side housing surface of the housing; and
    wherein the drainage microphone is positioned less than 30 degrees from the front microphone relative to a horizontal axis of the housing.

9. The image capture device of claim 8, wherein the drainage microphone is biased towards a front housing surface of the housing relative to a vertical centerline of the housing.

10. The image capture device of claim 9, further comprising:
    an audio assembly coupling the drainage microphone and the front microphone, the audio assembly configured to capture a first audio channel via the drainage microphone and a second audio channel via the front microphone from an audio source, the audio assembly further configured to output the audio channels; and
    a processor coupled to the audio assembly, the processor coupled with a memory storing instructions that when executed cause the processor to:
        receive the captured audio channels,
        apply a set of tuned beamforming parameters;
        process the captured audio channels using the set of tuned beamforming parameters to generate a first virtual audio channel and second virtual audio channel;
        combine the first virtual audio channel and the second virtual audio channel into an audio stream that is configured for stereo audio playback; and
        output the audio stream.

11. An image capture device, comprising:
a housing defining an audio depression;
a drainage microphone coupled to the housing at a location of the audio depression;
a cover coupled to the housing to protect the drainage microphone from an environment external to the image capture device; and
a drainage channel defined between the cover and the housing to drain moisture from the drainage microphone, the drainage channel defining a channel entrance having a channel entrance width and a channel entrance height, a channel volume having a channel volume width, a channel volume height, and a channel volume depth, and a channel exit having a channel exit width and a channel exit height;
wherein the channel entrance width is at least five times the channel entrance height; and
wherein the channel exit width is at least five times the channel exit height.

12. The image capture device of claim 11, wherein a ratio of a surface area of an opening of the channel entrance to the channel volume is greater than sixteen percent.

13. The image capture device of claim 11, wherein a ratio of a surface area of the channel exit to the channel volume renders the cover acoustically transparent by moving resonance outside of the 500 Hz to 9 kHz frequency range.

14. The image capture device of claim 13, wherein the channel entrance width is greater than 4 mm.

15. The image capture device of claim 11, wherein the channel entrance and the channel exit are positioned on a single surface of the housing;
wherein the cover includes an outer cover surface, an inner cover surface, and a lower cover chamfer formed on the inner cover surface adjacent the channel exit; and
wherein the lower cover chamfer and the audio depression form the channel exit angled between 20 degrees and 60 degrees relative to a vertical axis of the housing.

16. The image capture device of claim 11, further comprising:
a second microphone on a surface of the housing orthogonal to a bottom surface of the audio depression;
an audio assembly coupling the drainage microphone and the second microphone, the audio assembly configured to capture a first audio channel via the drainage microphone and a second audio channel via the second microphone from an audio source, the audio assembly further configured to output the audio channels; and
a processor coupled to the audio assembly, the processor coupled with a memory storing instructions that when executed causes the processor to:
receive the captured audio channels;
apply a set of tuned beamforming parameters;
process the captured audio channels using the set of tuned beamforming parameters to generate a first virtual audio channel and second virtual audio channel;
combine the first virtual audio channel and the second virtual audio channel into an audio stream that is configured for stereo audio playback; and
output the audio stream.

17. An image capture device comprising:
a housing defining an audio depression positioned on a first surface of the housing;
a drainage microphone coupled to the housing at a location of the audio depression;
a second microphone on a second surface of the housing orthogonal to the first surface;
a cover coupled to the housing to protect the drainage microphone from an environment external to the image capture device; and
a drainage channel defined between the cover and the housing to drain moisture from the drainage microphone, the drainage channel defining a channel entrance having a channel entrance width and a channel entrance height, a channel volume having a channel volume width, a channel volume height, and a channel volume depth, and a channel exit having a channel exit width and a channel exit height,
wherein the channel entrance width is at least five times the channel entrance height,
wherein the channel exit width is at least five times the channel exit height,
wherein a ratio of a surface area of an opening of the channel entrance to the channel volume is greater than ten percent,
wherein a ratio of a surface area of an opening of the channel exit to the channel volume is greater than ten percent,
wherein the ratio of the surface area of the opening of the channel entrance to the channel volume moves resonance outside of a 500 Hz to 9 kHz frequency range, and
wherein the ratio of the surface area of the opening of the channel exit to the channel volume moves resonance outside of a 500 Hz to 9 kHz frequency range.

18. The image capture device of claim 17, further comprising:
an audio assembly coupling the drainage microphone and the second microphone, the audio assembly configured to capture a first audio channel via the drainage microphone and a second audio channel via the second microphone from an audio source, the audio assembly further configured to output the audio channels; and
a processor coupled to the audio assembly, the processor coupled with a memory storing instructions that when executed causes the processor to:
receive the captured audio channels;
apply a set of tuned beamforming parameters;
process the captured audio channels using the set of tuned beamforming parameters to generate a first virtual audio channel and second virtual audio channel;
combine the first virtual audio channel and the second virtual audio channel into an audio stream that is configured for stereo audio playback; and
output the audio stream.

19. The image capture device of claim 18, wherein the channel entrance and the channel exit are positioned on the first surface of the housing;
wherein the cover includes an outer cover surface, an inner cover surface, and a lower cover chamfer formed on the inner cover surface adjacent the channel exit; and
wherein the lower cover chamfer and the audio depression form the channel exit angled between 20 degrees and 60 degrees relative to a vertical axis of the housing.

20. The image capture device of claim 19, wherein the drainage microphone is positioned less than 30 degrees from the second microphone relative to a horizontal axis of the housing.

* * * * *